US010427909B2

(12) United States Patent
Chapman et al.

(10) Patent No.: US 10,427,909 B2
(45) Date of Patent: Oct. 1, 2019

(54) USER-CONTROLLED ELEVATOR ALLOCATION FOR INDEPENDENT SERVICE

(71) Applicant: Otis Elevator Company, Farmington, CT (US)

(72) Inventors: Ashley Chapman, Plainville, CT (US); Eric C. Peterson, East Longmeadow, MA (US); Bradley Armand Scoville, Farmington, CT (US); Paul A. Simcik, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 593 days.

(21) Appl. No.: 15/183,923

(22) Filed: Jun. 16, 2016

(65) Prior Publication Data

US 2016/0368733 A1 Dec. 22, 2016

Related U.S. Application Data

(60) Provisional application No. 62/182,046, filed on Jun. 19, 2015.

(51) Int. Cl.
*B66B 1/18* (2006.01)
*B66B 1/46* (2006.01)
(Continued)

(52) U.S. Cl.
CPC ............ *B66B 1/468* (2013.01); *B66B 1/2408* (2013.01); *B66B 1/2466* (2013.01); *B66B 9/00* (2013.01);
(Continued)

(58) Field of Classification Search
CPC ..... B66B 1/468; B66B 1/2408; B66B 1/2466; B66B 2201/103; B66B 2201/104;
(Continued)

(56) References Cited

U.S. PATENT DOCUMENTS 4,431,086 A 2/1984 Moser et al.
6,354,405 B1 * 3/2002 Svensson-Hilford ........................ B66B 1/468 187/384
(Continued)

FOREIGN PATENT DOCUMENTS

CN 101238057 A 8/2008
CN 101492137 A 7/2009
(Continued)

OTHER PUBLICATIONS

The Cadillac Fairview Corporation Limited, "Freight Elevator Booking", Waterfront Properties, http://www.thewaterfrontproperties.ca/en/contractors/Pages/freightelevatorbooking.aspx, 2001, accessed Jun. 15, 2016, 1 page.
(Continued)

*Primary Examiner* — Anthony J Salata
(74) *Attorney, Agent, or Firm* — Cantor Colburn LLP

(57) ABSTRACT

A system for allocating elevator use based on an individual request includes a request module that receives a reservation request of an elevator car from a user, an allocation module that identifies a reserved elevator car based on the reservation request; and a mechanical control module that moves the reserved elevator car in response to commands provided by the user and the reservation request.

8 Claims, 3 Drawing Sheets

(51) Int. Cl.
*B66B 1/24* (2006.01)
*B66B 9/00* (2006.01)

(52) U.S. Cl.
CPC ......... *B66B 9/003* (2013.01); *B66B 2009/006* (2013.01); *B66B 2201/103* (2013.01); *B66B 2201/104* (2013.01); *B66B 2201/307* (2013.01); *B66B 2201/401* (2013.01); *B66B 2201/402* (2013.01); *B66B 2201/4607* (2013.01)

(58) Field of Classification Search
CPC ..... B66B 2201/402; B66B 9/00; B66B 9/003; B66B 2201/307; B66B 2201/401; B66B 2201/4607; B66B 2209/006
USPC ....... 187/247, 249, 380–388, 391, 392, 393, 187/396
See application file for complete search history.

(56) References Cited

U.S. PATENT DOCUMENTS

| | | | | |
|---|---|---|---|---|
| 6,481,536 | B2 * | 11/2002 | Pfeffer | B66B 1/18 187/247 |
| 7,377,364 | B2 * | 5/2008 | Tyni | B66B 1/468 187/380 |
| 8,151,943 | B2 * | 4/2012 | de Groot | B66B 1/2458 187/382 |
| 8,220,591 | B2 * | 7/2012 | Atalla | B66B 1/20 187/383 |
| 8,499,895 | B2 * | 8/2013 | Zweig | B66B 1/468 187/247 |
| 8,915,334 | B2 * | 12/2014 | Finschi | B66B 1/2408 187/384 |
| 9,284,158 | B2 * | 3/2016 | Sarjanen | B66B 1/468 |
| 9,323,232 | B2 * | 4/2016 | Blom | H04W 4/029 |
| 9,469,500 | B2 * | 10/2016 | Friedli | B66B 1/2408 |
| 9,988,237 | B1 * | 6/2018 | Arguedas | B66B 1/2408 |
| 10,035,679 | B2 * | 7/2018 | Armistead | B66B 1/46 |
| 10,118,797 | B2 * | 11/2018 | Keser | B66B 1/468 |
| 2007/0017753 | A1 | 1/2007 | Ylinen et al. | |
| 2008/0067013 | A1 | 3/2008 | Ylinen et al. | |
| 2008/0236956 | A1 | 10/2008 | Finschi | |
| 2010/0078266 | A1 | 4/2010 | Choi | |
| 2014/0339023 | A1 | 11/2014 | Friedli | |

FOREIGN PATENT DOCUMENTS

| | | | |
|---|---|---|---|
| CN | 101878173 | A | 11/2010 |
| CN | 102190220 | A | 9/2011 |
| CN | 103303753 | A | 9/2013 |
| CN | 103950804 | A | 7/2014 |
| CN | 203820215 | U | 9/2014 |
| JP | H03152069 | A | 6/1991 |
| JP | H0826638 | A | 1/1996 |
| JP | H1053377 | A | 2/1998 |
| JP | 2003267637 | A | 9/2003 |
| JP | 2004043100 | A | 2/2004 |
| JP | 2006306553 | A | 11/2006 |
| JP | 2010013207 | A | 1/2010 |
| JP | 2014172719 | A | 9/2014 |
| KR | 100554918 | | 3/2006 |
| WO | 2007132058 | A1 | 11/2007 |
| WO | 2015070926 | A1 | 5/2015 |

OTHER PUBLICATIONS

European Search Report for application EP 16175136.7, dated Nov. 21, 2016, 8 pages.
Chinese Office Action for application CN 201610446245.6, dated May 17, 2019, U320351CN, 8 pages.

* cited by examiner

USER-CONTROLLED ELEVATOR ALLOCATION FOR INDEPENDENT SERVICE

CROSS-REFERENCE TO RELATED APPLICATIONS

This application claims the benefit of U.S. provisional patent application Ser. No. 62/182,046, filed Jun. 19, 2015, the entire contents of which are incorporated herein by reference.

BACKGROUND

The present disclosure relates generally to an elevator system and, more specifically, to an elevator system that allows a user to reserve an elevator for a specified amount of time.

Elevator behavior can be undesirable for users performing specialized tasks, or for users with limited mobility. When a user of an elevator system would like to move large quantities of items, for example, the door times, number of stops, and timeliness of elevator arrival can disrupt the completion of this task. Additionally, a user with limited mobility may require extra load time not afforded by default elevator settings. In addition, a user may wish to decrease a wait time beyond typical elevator operation.

BRIEF DESCRIPTION

According to a non-limiting embodiment of the present disclosure, a system for allocating elevator use based on an individual request includes a request module that receives a reservation request of an elevator car from a user; an allocation module identifies a reserved elevator car based on the reservation request; and a mechanical control module that moves the reserved elevator car in response to commands provided by the user and the reservation request.

In addition to one or more of the features described above or below, or as an alternative, further embodiments could include a service quality monitoring module monitors a quality of service of an elevator bank that includes the reserved elevator car.

In addition to one or more of the features described above or below, or as an alternative, further embodiments could include a service quality monitoring module sets a service threshold and instructs the allocation module to deny the reservation request in response to a quality of service falling below a service threshold.

In addition to one or more of the features described above or below, or as an alternative, further embodiments could include a service threshold generated based on historical elevator data that includes historical elevator traffic of an elevator bank of the reserved elevator car.

In addition to one or more of the features described above or below, or as an alternative, further embodiments could include the reservation request specifying time parameters for elevator car reservation that include at least one of a day, a time and location for a reservation.

In addition to one or more of the features described above or below, or as an alternative, further embodiments could include the reservation request specifying an independent service that dedicates a reserved elevator car for operation by the user.

In addition to one or more of the features described above or below, or as an alternative, further embodiments could include the reservation request specifying that an alternate elevator car may be available when the user provides notification of arrival at the reserved elevator car.

According to a non-limiting embodiment of the present disclosure, a method for allocating elevator use based on an individual request comprises receiving a reservation request of an elevator car from a user, identifying a reserved elevator car based on the reservation request, and moving the reserved elevator car in response to commands provided by the user and the reservation request.

In addition to one or more of the features described above or below, or as an alternative, further embodiments could include monitoring a quality of service of an elevator bank that includes the reserved elevator car.

In addition to one or more of the features described above or below, or as an alternative, further embodiments could include setting a service threshold and instructing the allocation module to deny the reservation request in response to a quality of service falling below a service threshold.

In addition to one or more of the features described above or below, or as an alternative, further embodiments could include generating the service threshold based on historical elevator data that includes historical elevator traffic of an elevator bank of the reserved elevator car.

In addition to one or more of the features described above or below, or as an alternative, further embodiments could include the reservation request specifies time parameters for elevator car reservation that include at least one of a day, a time and location for a reservation.

In addition to one or more of the features described above or below, or as an alternative, further embodiments could include the reservation request specifies an independent service that dedicates a reserved elevator car for operation by the user.

In addition to one or more of the features described above or below, or as an alternative, further embodiments could include the reservation request specifies that an alternate elevator car may be available when the user provides notification of arrival at the reserved elevator car.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
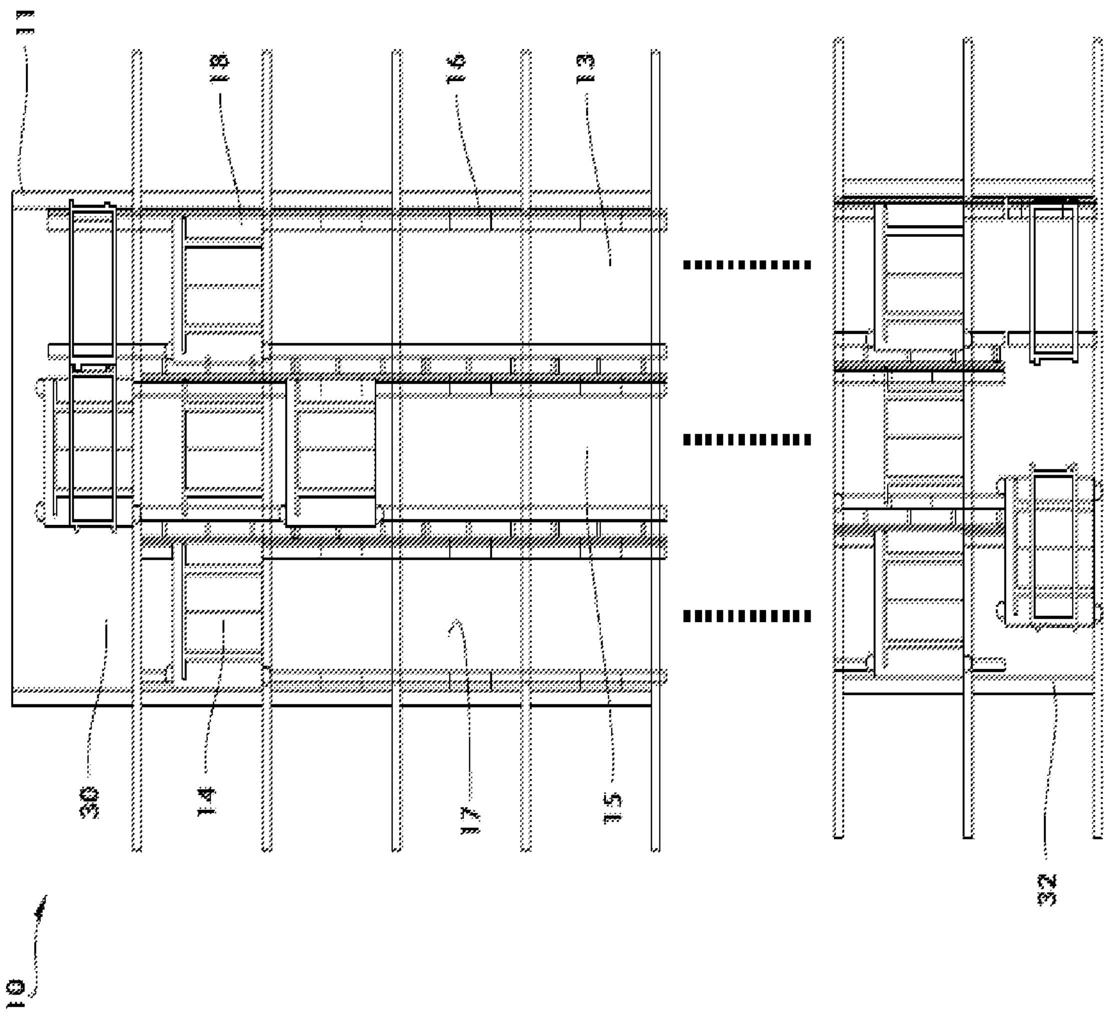
FIG. 1 is a schematic illustration of an elevator system.

Referring to FIG. 1, an elevator system 10 may include a stationary support structure 11 that may generally be an integral part of a multi-story building, and at least one lane or hoistway (i.e., three hoistways 13, 15, 17 illustrated) having boundaries generally defined by the structure 11. The system 10 further includes at least one car 14 that travels within at least one of the hoistways 13, 15, 17. The car 14 may travel in a vertical direction, and may further be in a dedicated upward direction in hoistway 24 and a dedicated downward direction in hoistway 13 (as one, non-limiting, example). It is further contemplated and understood that the elevator system 10 may be self-propelled, and may have multiple cars 30 traveling in any one hoistway 13, 15, 17 with the multiple cars traveling in an upward direction in hoistway 15 and a downward direction in hoistway 13.

The elevator system 10 may further include at least one transfer station 30 generally located at or above the top floor and at or below the bottom floor. The at least one transfer station 30 may impart horizontal movement of the cars 14, thereby facilitating transfer of the cars 14 between hoistways 13, 15, 17. Although not shown in FIG. 1, one or more intermediate transfer stations, similar to station 30 may be used between the first floor and the top floor.

Figure 2:
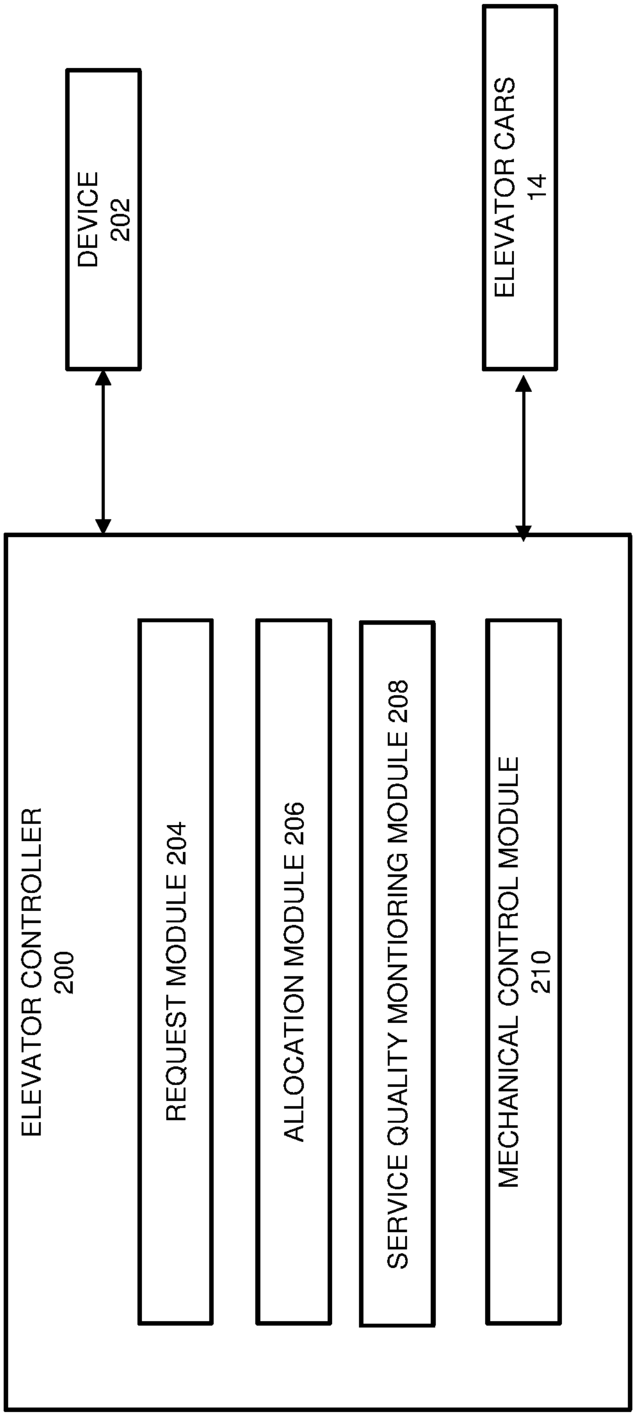
FIG. 2 illustrates an elevator controller in accordance with one embodiment of the present disclosure.

FIG. 2 illustrates an elevator controller 200 in accordance with one embodiment. The elevator controller 200 generates signals that move the cars 14. The elevator controller 200 is configured to communicate with a device 202, for example, that allows a user to provide a reservation request to the elevator controller 200. The reservation request can specify time parameters for elevator operation. The reservation request can further specify whether the elevator controller 200 must have an elevator car available when the user arrives at an elevator platform, or whether a user is requesting independent, dedicated service of an elevator car. When a user requests independent service, the elevator controller 200 may specifically allocate an individual elevator car of the elevator cars 14 for the user.

The elevator controller 200 includes a request module 204, an allocation module 206, a service quality module 208 and a mechanical control module 210. The request module 204 evaluates a reservation request from the user. The request module 204 may be connected to the Internet, a local-area-network, or any other type of network, for example, in a wired or wireless connection. The device 202 may be a smartphone, tablet, computer, or kiosk running a website or smartphone application as described in more detail below.

The reservation request may specify time parameters for elevator car reservation. The time parameters may indicate a day, time and location for a reservation, along with the desired availability of the elevator car. For example, if a user is performing a task where storage of belongings is required in the elevator car, the user may request independent service as the desired availability of the elevator car.

An allocation module 206 of the elevator controller 200 is configured to communicate with the request module 204. The allocation module 206 identifies a reserved elevator car based on the reservation request. The allocation module 206 can track the total reserved time that an elevator car or cars of an elevator bank have been reserved over a given time period.

For example, an administrator, such as a building manager, can define a maximum total time that elevator cars can be reserved over a given time period (e.g., one hour per day, four hours per week, six hours per month, etc.). If the total reserved time has been exceeded at the time of the request, the allocation module 206 can deny the reservation request. The allocation module 206 communicates with the request module 204, and the request module 204 transmits a message to the user. The message may notify the user that the reservation request for an elevator car has been denied.

The allocation module 206 may also communicate with the service quality monitoring module 208. The service quality monitoring module 208 monitors a quality of service of elevator cars of the elevator bank that are not subject to a reservation. Additionally, the service quality monitoring module 208 may monitor the quality of service of all cars operating within the elevator bank prior to the request.

A service threshold may be set by the service quality monitoring module 208 to maintain a minimum quality of service of the elevator cars of the elevator bank. The service threshold may include or be computed based on an average wait time, average transit time, etc. If the service threshold is not met, i.e. a minimum level of service is not provided, the service quality monitoring module 208 may transmit a message to the allocation module 206 indicating that the reservation request cannot be granted. Alternatively or additionally, the allocation module 206 may terminate an active reservation after a reservation has been granted, depending on whether the service threshold continues to be met.

Additionally, the service quality monitoring module 208 may store historical traffic data of the elevator bank. A specific time period, such as a weekday between 4 PM and 6 PM may be an exceptionally busy time for the elevator bank, meaning that the elevator bank may be required to accommodate a high volume of passengers during this time period. The service quality monitoring module 208 may preemptively conclude that the service threshold will not be met if a reservation is granted during a specific, historically high volume time period. Accordingly, the service quality monitoring module 208 may instruct the allocation module 206 that a request should not be granted during the specific, high-volume time period.

The allocation module 208 may be in communication with the mechanical control module 210 of the elevator controller 200. The mechanical control module 210 controls motion of the reserved elevator car and the elevator cars that have not been reserved of the elevator cars 14.

Figure 3:
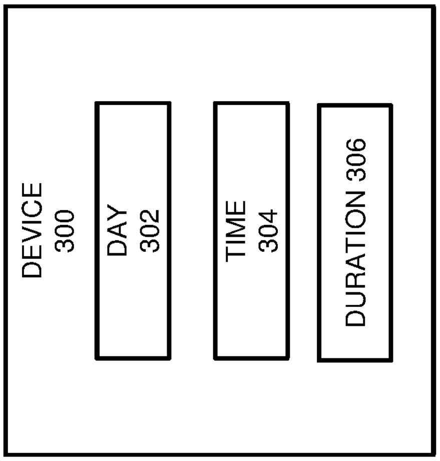
FIG. 3 illustrates a device running a software application in accordance with one embodiment of the present disclosure.

Referring to FIG. 3 with continuing reference to FIG. 2, FIG. 3 represents a device 300 running a software application in accordance with one embodiment of the present disclosure. Alternatively, the device 300 can access a website, an external kiosk etc. to make a reservation request. In addition, the device may be a portable smart phone, a portable smart tablet, or be affixed to a kiosk of an elevator system, for example. The software application may run in conjunction with an existing elevator management software.

The device 300 may prompt a user to enter request parameters including a day 302, a time 304 and a duration 306 in which an elevator is to be reserved. A user may enter the day 302, time 304 and duration 306 within the software application as shown. The user may submit the request parameters to the request module 204. After processing, the request module 204 may notify the user that a request has been granted or denied on the device.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims. Modifications and equivalents may be made to the features of the claims without departing from the scope of the invention.

The invention claimed is:

1. A system for allocating elevator use based on an individual request, the system comprising:

a request module that receives a reservation request of an elevator car from a user;

an allocation module that identifies a reserved elevator car based on the reservation request; and a mechanical control module that moves the reserved elevator car in response to commands provided by the user and the reservation request;

wherein the reservation request specifies a time parameter for reservation request, the time parameter including at least one of a day and a time the reserved elevator car is requested;

wherein the reservation request includes a location where the reserved elevator car is desired;

the reservation request specifies an independent service that dedicates a reserved elevator car for operation by the user.

2. The system of claim 1, further comprising a service quality monitoring module that monitors a quality of service of an elevator bank that includes the reserved elevator car to maintain and quality of service of elevator cars in the elevator bank.

3. The system of claim 2, the service quality monitoring module sets a service threshold and instructs the allocation module to deny the reservation request in response to a quality of service falling below a service threshold.

4. The system of claim 3, the service threshold is generated based on historical elevator data that includes historical elevator traffic of an elevator bank of the reserved elevator car.

5. A method for allocating elevator use based on an individual request, the method comprising:

receiving a reservation request of an elevator car from a user;

identifying a reserved elevator car based on the reservation request; and moving the reserved elevator car in response to commands provided by the user and the reservation request;

wherein the reservation request specifies a time parameter for reservation request, the time parameter including at least one of a day and a time the reserved elevator car is requested;

wherein the reservation request includes a location where the reserved elevator car is desired;

wherein the reservation request specifies an independent service that dedicates a reserved elevator car for operation by the user.

6. The method of claim 5, further comprising monitoring a quality of service of an elevator bank that includes the reserved elevator car to maintain and quality of service of elevator cars in the elevator bank.

7. The method of claim 6, further comprising setting a service threshold and instructing the allocation module to deny the reservation request in response to a quality of service falling below a service threshold.

8. The method of claim 7, generating the service threshold based on historical elevator data that includes historical elevator traffic of an elevator bank of the reserved elevator car.

* * * * *